UNITED STATES PATENT OFFICE.

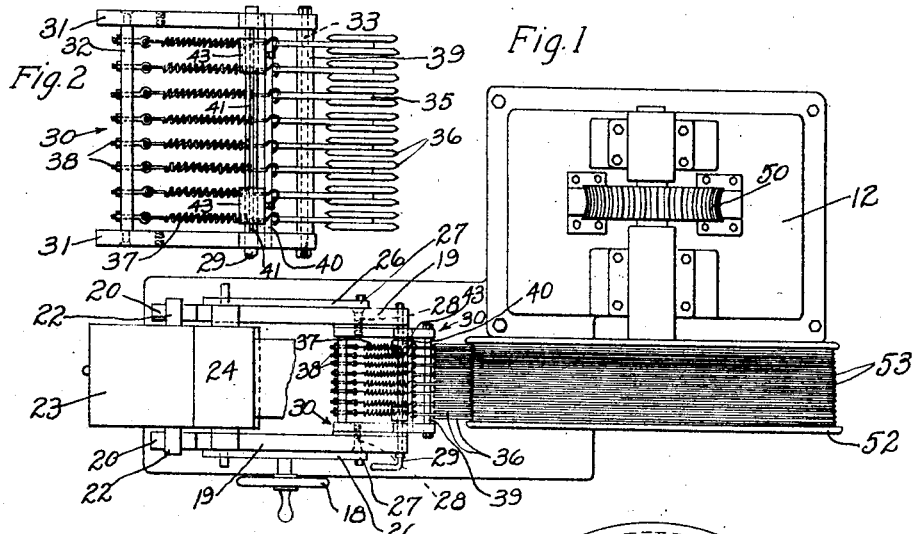

AMBROSE WEATHERILL, OF AKRON, OHIO, ASSIGNOR TO THE GOODYEAR TIRE & RUBBER COMPANY, OF AKRON, OHIO, A CORPORATION OF OHIO.

APPARATUS FOR ATTACHING TIRE-BASES TO RIMS.

1,394,186.  Specification of Letters Patent.  Patented Oct. 18, 1921.

Application filed April 28, 1919. Serial No. 293,187.

*To all whom it may concern:*

Be it known that I, AMBROSE WEATHERILL, a citizen of the United States, and resident of Akron, Ohio, have invented new and useful Improvements in Apparatus for Attaching Tire-Bases to Rims, of which the following is a specification.

My present invention relates to an improved apparatus for applying to a base rim on which a solid rubber tire is to be formed, a comparatively thin strip of rubber compound, hereinafter referred to as a base band, prior to the application of the solid tire body itself.

It has been found that a suitable method of securing a solid rubber tire to a base rim, which is to be subsequently mounted on a wheel, is to provide the base rim with a series of circumferential corrugations into which is pressed so as to completely fill the channels formed by the corrugations, a strip of rubber compound. Upon this rubber strip or base band the rubber to form the body or tread of the tire is laid, and the tire thus built up is vulcanized, the base band vulcanizing to hard rubber.

The hard rubber base band must be so pressed, before vulcanization thereof, into the channels of the rim as to conform exactly thereto, in order to avoid and prevent the formation of air cavities, thereby insuring a closer and more complete adhesion of the base band to both the tire and rim, otherwise the base band and tire might soon be pulled away from each other and from the rim. In fact it is upon this feature that the success of the solid tire depends.

It has been the practice hitherto, to apply this rubber base by hand, a suitable tool known in the art as a "stitcher," being used by the workman to force the rubber into the corrugations. It will be understood, however, that such a method may not secure uniformity of application of the base, since attention can be given by the workman to but one corrugation at a time, and lack of uniformity of application may result in insecurity of attachment.

By application of the rubber base mechanically, on the other hand, and in accordance with my invention, the whole width of the rubber strip will be simultaneously pressed into place, with uniformity, precision, and economy.

It is, therefore, the principal object of my invention to provide an apparatus for mechanically attaching this rubber base to a base rim, which apparatus consists of a mechanical stitcher adapted to apply the strip to a power driven rim, uniformly forcing the rubber into the corrugations of the rim channels.

A more specific object of my invention is to provide a mechanical stitcher having a plurality of separate elements which shall force the rubber strip into each of the corrugations, all the elements acting together, yet each one having an individual resistance so that any irregularity in the rim may be compensated for.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention, and throughout the several views of which similar reference numerals designate corresponding parts:

Figure 1 is a plan view of a base band applying apparatus, constructed in accordance with my invention;

Fig. 2 is a plan view of the stitcher mechanism thereof;

Fig. 3 is a side elevation of the apparatus; and

Fig. 4 is a detail view of one of the stitcher elements.

The apparatus of my invention includes essentially two units, namely; the stitcher mechanism A, and the rim supporting and rotating mechanism B.

Both units A and B are supported by a common base 10, and from which rise two pedestals 11 and 12. The pedestal 11 constitutes the support for the stitcher mechanism unit A, and has mounted thereon a carriage base 13, which is adjustable toward and away from a base rim carried by the rim supporting and rotating mechanism B. This adjustment is effected by means of a hand wheel 14, adapted for the operation of any suitable adjusting mechanism, (not shown), the specific mechanism constituting no part of my present invention.

A stitcher plate 15 provided with an offset dove-tail 16, is mounted on the carriage base 13, which has a corresponding inset dove-tailed groove 17 for the reception of the dove-tail 16 of the plate 15. The stitcher plate 15 is transversely adjustable on the carriage base 13 by means of a handwheel 18, operating in a manner similar to the handwheel 14.

The stitcher plate 15 is provided with a pair of upstanding side frames 19, the rear extremities 20 of which are formed with open socket portions 21, adapted to loosely accommodate the ends of a shaft 22 of a stock roll 23. The surface of the roll 23 is arranged so as to have in contact with it the surface of a smaller roller 24, upon which the liner that was between the windings of the stock on the stock roll 23 is rewound, the stock roll operating to rotate the liner roll by its frictional contact therewith. The liner roll 24 has its shaft 25 mounted in bearings carried by arms 26 pivotally mounted on the side frames 19 at 27.

Between the side frames 19 is supported by means of screws 28, and a cam supporting shaft 29, a rectangular stitcher-carrying-frame 30, made up of side arms 31 joined together by cross-bars 32 and 33, the latter cross-bar 33 passing through brackets 34. On the cross-bar 33 a series of bell-crank levers 35 is pivotally mounted, the upper and shorter arm of each lever supporting loosely in suitable bearings two rotatable beveled edge disks or stitchers 36, one on each side of the arm. To the longer and lower arm of each lever 35 is secured one end of a coiled contraction spring 37, the other end of the spring 37, being attached to an adjustable screw 38 so that the tensions of the springs 37 may be adjusted.

Between the side arms 31 and the levers adjacent thereto, and between the several levers, spacing sleeves 39 are provided on the cross-bar 33, for keeping the levers in properly spaced relation. A rod 40 is secured to the frame 30 in a position to be engaged by the lower arms of the levers 35 to limit their travel, and against which they are normally held in engagement by the springs 37.

The shaft 29 is supported at its ends by the side frames 19 and is provided with a keyway 41, in which keys 42, carried by cam elements 43, are received, whereby the cam elements 43 may be adjustably secured on the shaft 29, as will be readily understood. The cam shaft 29 is adapted to be operated by a handle 29ᵃ at the end thereof.

The unit B, including the rim supporting and rotating mechanism, consists of the base 10 supporting the pedestal 12, on which is mounted a revoluble chuck 44, the latter being of the usual construction, and carrying extensible arms 45 which may be adjusted with respect to the axis of the chuck, through the medium of the operating handwheel 46. A motor 47 is arranged on the base 10, and drives, by belt connection 48, the counter-shaft 49, which has a worm (not shown) adapted to mesh with the worm-wheel 50, which in turn is carried on the shaft 51 of the chuck. The outer extremities of the arms 45 are formed with chisel edges adapted to fit within an interior central groove formed in the inner periphery of a removable and replaceable base rim 52, to which the base band is to be applied.

The base rim is provided on its outer surface with a series of circumferential corrugations 53, as seen in Fig. 1, and referred to above.

From the above description considered in connection with the accompanying drawing, the operation will be readily apparent. It is as follows:

A rim 52 to which a base band is to be applied is mounted on the chuck 44, and the stitcher mechanism is adjusted by manipulation of the handwheels 14 and 18 so that the number of disks or stitchers 36 corresponding to the number of corrugations of the base rim 52, will fit between the flanges of the rim, one disk or stitcher fitting precisely into each groove formed by the corrugations. In this connection, it will be noted that the mechanism can be adjusted to accommodate itself to rims of different width, by operating the cams 43, by means of the handle 29ᵃ. The cams 43 will thus be brought into the position shown in Fig. 4, to throw out of operation one or more of the stitchers 36, the number thrown out of operation being determined by adjusting the position of cams 43 on the shaft 29; such adjustment is permitted by the key-way 41 and the cam key 42.

The stock roll 23 and liner roll 24 being in place, the strip from the stock roll is brought down into place against the corrugated portion of the rim 52, which is now slowly rotated by the motor 47 and the connected driving mechanism for one complete revolution, whereupon the stock supply is severed leaving a single layer pressed upon the rim.

As the rim rotates the base band is uniformly pressed on the rim, and into the corrugations thereof by the stitchers 36, which are caused to impinge on the band with any uniform desired pressure, the degree of pressure being ascertained by adjustment of the tensions of the springs 37.

As the roll 23 unwinds the roll 24 will, by its frictional and gravitational contact therewith, be caused to rotate in the opposite direction to wind thereon the liner strip.

It will be noted that any unevenness of the base rim, or in the corrugations thereof, will be properly compensated for by the resilient or yieldable mounting of the stitchers, at once holding them firmly in the channels or grooves and yet permitting their movement outward when necessitated by any ununiform curvature.

It will now be seen that I have provided an improved apparatus for the purpose described, that will perform the operation of applying a base band to a rim prior to the application of a solid rubber tire thereto, in a uniform, efficient, and economical manner, and which will do away with the objections and costs incident to hand operation.

What I claim is:

1. An apparatus of the kind described, comprising means for supporting and rotating a base rim, means for applying a strip of material to said rim, including a plurality of members mounted thereon, each of said members carrying a stitcher, and means for holding said stitchers against said rim.

2. An apparatus of the kind described, comprising means for supporting and rotating a base rim, means for applying a strip of material to said rim, including a plurality of members pivotally mounted thereon, each of said members carrying a stitcher, and means for holding said stitchers against said rim.

3. An apparatus of the kind described, comprising means for supporting and rotating a base rim, means for applying a strip of material to said rim, including a plurality of members mounted thereon, each of said members carrying a stitcher, and yieldable means for holding said stitchers against said rim.

4. An apparatus of the kind described, comprising means for supporting and rotating a base rim, means for applying a strip of material to said rim, including a plurality of members pivotally mounted thereon, each of said members carrying a stitcher, and yieldable means for holding said stitchers against said rim.

5. An apparatus of the kind described, comprising means for supporting and rotating a base rim, means for applying a strip of material to said rim, including a plurality of members mounted thereon, each of said members carrying a stitcher, means for holding said stitchers against said rim, and means for throwing one or more of said stitchers out of operation.

6. An apparatus of the kind described, comprising a base rim, means for supporting and rotating said base rim, means for applying a strip of material to said rim, including a plurality of members mounted thereon, each of said members carrying a plurality of stitchers, and means for holding said stitchers against said rim.

7. An apparatus of the kind described, comprising a base rim, means for supporting and rotating said base rim, means for applying a strip of material to said rim, including a plurality of members pivotally mounted thereon, each of said members carrying a plurality of stitchers, and yieldable means for holding said stitchers against said rim.

8. An apparatus of the kind described, comprising a base rim, means for supporting and rotating said base rim, means for applying a strip of material to said rim, including a plurality of levers mounted thereon, each of said levers carrying a stitcher, and means for holding said stitchers against said rim.

9. An apparatus of the kind described, comprising a base rim, means for supporting and rotating said base rim, means for applying a strip of material to said rim, including a plurality of independent levers mounted thereon, each of said levers carrying a stitcher, and means for holding said stitchers against said rim.

10. An apparatus for applying a band of material to the channel of a base rim comprising a rotatable support for the rim, a stitching device having a plurality of members thereon, each of said members carrying a stitcher, means for holding said stitchers in engagement with the rim for pressing a band of material thereon, and a slidable support for the stitching device.

11. A device adapted to be pressed against the outer circumference of a corrugated rim for pressing a band of rubber compound into the corrugations and over the ribs defined therebetween, including a plurality of elements mounted on said device each of said elements carrying a disk, each of said disks being adapted to coöperate with one of the corrugations of said rim, and means for pressing each of said disks into its corresponding corrugation.

12. A device adapted to be pressed against the outer circumference of a corrugated rim for pressing a band of rubber compound into the corrugations and over the ribs defined therebetween, including a plurality of independent elements mounted on said device each of said elements carrying a disk, each of said disks being adapted to coöperate with one of the corrugations of said rim, means for pressing each of said disks into its corresponding corrugation, and means for throwing one or more of said disks out of operation.

13. A device adapted to be pressed against the outer circumference of a corrugated rim for pressing a band of rubber compound into the corrugations and over the ribs defined therebetween, including a pluralitiy of independent elements mounted on said device each of said elements carrying a disk, each of said disks being adapted to coöperate with one of the corrugations of said rim, and means for yieldably pressing each of said disks into its corresponding corrugation.

14. A device adapted to be pressed against the outer circumference of a corrugated rim for pressing a band of rubber compound into the corrugations and over the ribs defined therebetween, including a frame, a support for said frame, a shaft carried by said frame, a plurality of elements independently mounted on said shaft, a stitcher mounted on each of said elements, each of said stitchers being adapted to coöperate with one of the corrugations of said rim, and separate means for pressing each of said stitchers into its corresponding corrugation.

In witness whereof, I have hereunto signed my name in the presence of two subscribing witnesses.

AMBROSE WEATHERILL.

Witnesses:
C. A. STRAW, JR.,
E. C. LEADENHAM.